(12) United States Patent
Frelich et al.

(10) Patent No.: US 7,931,104 B2
(45) Date of Patent: Apr. 26, 2011

(54) MACHINE HAVING COOLING SYSTEM AND METHOD

(75) Inventors: Toby Frelich, Saint Michael, MN (US); Andrew J. Krolnik, Brooklyn Park, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 909 days.

(21) Appl. No.: 11/895,876

(22) Filed: Aug. 28, 2007

(65) Prior Publication Data

US 2009/0056651 A1    Mar. 5, 2009

(51) Int. Cl.
*B60K 11/06* (2006.01)

(52) U.S. Cl. ....................................... 180/68.1; 180/68.3

(58) Field of Classification Search .................. 180/68.1, 180/68.2, 68.3, 68.4, 309
See application file for complete search history.

(56) References Cited

U.S. PATENT DOCUMENTS

| | | | |
|---|---|---|---|
| 4,339,014 A | 7/1982 | Berth et al. | |
| 4,854,278 A * | 8/1989 | Honecker | 123/198 E |
| 5,678,648 A | 10/1997 | Imanishi et al. | |
| 5,689,953 A | 11/1997 | Yamashita et al. | |
| 5,709,175 A | 1/1998 | Carroll | |
| 5,938,371 A | 8/1999 | Gustin et al. | |
| 6,202,777 B1 | 3/2001 | Surridge | |
| 6,302,066 B1 | 10/2001 | Steinmann | |
| 6,386,306 B2 * | 5/2002 | Contoli et al. | 180/68.4 |
| 6,431,299 B1 | 8/2002 | Asche et al. | |
| 6,832,872 B2 | 12/2004 | Koelm et al. | |
| 7,134,518 B2 | 11/2006 | Arai et al. | |
| 7,694,766 B2 * | 4/2010 | Gotz et al. | 180/68.1 |
| 2004/0045754 A1 * | 3/2004 | Bland | 180/68.1 |

* cited by examiner

*Primary Examiner* — J. Allen Shriver, II
*Assistant Examiner* — John D Walters
(74) *Attorney, Agent, or Firm* — Liell & McNeil

(57) ABSTRACT

A machine includes a body having a cooling air inlet and a cooling air outlet, and having an engine compartment therein. A second compartment is positioned vertically above and fluidly connected with the engine compartment. At least one open-air operator station is positioned on a deck of the body, and a cooling system draws cooling air in a flow path through the engine compartment, into the second compartment and exhausts the cooling air in a forward direction away from the operator station.

20 Claims, 3 Drawing Sheets

MACHINE HAVING COOLING SYSTEM AND METHOD

TECHNICAL FIELD

The present disclosure relates generally to machine cooling strategies, and relates more particularly to a cooling system and method wherein cooling air exits a machine in a forward direction away from an open-air operator station.

BACKGROUND

Essentially all machines having internal combustion engines require some type of cooling system. Cooling systems range from simple air fins on the engine providing extra surface area for exchanging heat with ambient air to relatively sophisticated systems with multiple radiators, each having a separate fluid circuit for coolant fluid or oil. Many machines utilize an air cooling system to blow or draw cooling air over engine components and associated radiators, oil coolers, etc., then exhaust the cooling air back to ambient. Of particular note are relatively heavy-duty machines such as construction machines, which often have several machine subsystems which must be cooled for proper operation. Paving machines, for example, often include an engine system, a hydraulic system and an engine air intake system, each of which may include a heat exchanger cooled via ambient air drawn or blown inside a body of the machine, then exhausted after exchanging heat with one or more of the heat exchangers.

One common design for a paving machine cooling system utilizes a fan which is positioned within an engine compartment of the machine and draws cooling air into the engine compartment from a lateral side of the machine. The cooling air passes across and/or through engine components and heat exchange surfaces of one or more heat exchangers, then is exhausted through the opposite lateral side of the machine. In general, this cooling system strategy has worked well. However, there are certain aspects which might be improved upon.

On the one hand, in many paving systems workers are commonly stationed alongside the machine, or need to move along the lateral sides of the machine as work progresses. Exhausting hot air laterally of the machine can affect the comfort of the working environment. In addition, certain paving machines utilize devices positioned at lateral sides of the machine which are susceptible to damage or aberrant operation if they become too hot. Certain sensors, such as sonic locating sensors used during paving a mat of paving material also rely upon relatively consistent and/or predictable properties of air for proper operation. Where these sensors encounter either relatively high temperatures, or wide variations in temperature, they may not function optimally.

The present disclosure is directed to one or more of the problems or shortcomings set forth above.

SUMMARY OF THE DISCLOSURE

In one aspect, the present disclosure provides a machine having a body with a front end, a back end and at least one cooling air inlet. The body further includes an engine compartment and a second compartment positioned vertically above and fluidly connected with the engine compartment. The second compartment defines a cooling air outlet from the body which is vertically above the at least one cooling air inlet. The machine further includes at least one open-air operator station mounted on the body and positioned vertically above the engine compartment and rearward of the second compartment. The machine still further includes a cooling system having a fan which is configured to draw cooling air in a flow path through the body. The flow path includes an intake segment whereby cooling air enters the engine compartment via the at least one cooling air inlet, a second segment whereby cooling air travels from the engine compartment to the second compartment and a terminal segment whereby cooling air exits the body via the cooling air outlet in a forward direction away from the at least one operator station.

In another aspect, the present disclosure provides a method of cooling a machine system that includes the steps of drawing cooling air for a machine system into an engine compartment of a machine body via an intake segment of a cooling air flow path, and drawing the cooling air from the engine compartment into a second compartment positioned vertically above the engine compartment via a second segment of the cooling air flow path. The method further includes a step of ejecting the cooling air from the machine body in a forward direction away from an open-air operator station positioned vertically above the engine compartment and rearward of the second compartment via a terminal segment of the cooling air flow path.

In still another aspect, the present disclosure provides a cooling system subassembly for a machine that includes a housing having a front end and a back end, an upper side and a lower side. The housing further includes mounting elements having a configuration adapted to position the housing on a machine body in a location forward of an open-air operator station on the machine body and vertically above an engine compartment within the machine body. The housing further includes a cooling air inlet disposed in the lower side and a cooling air outlet. The cooling system subassembly still further includes a fan disposed at least partially within the housing and adapted to draw cooling air from the engine compartment into the housing via a segment of a cooling air flow path and eject cooling air from the outlet via a terminal segment of the flow path in a forward direction away from the open-air operator station.

DETAILED DESCRIPTION

Figure 1:
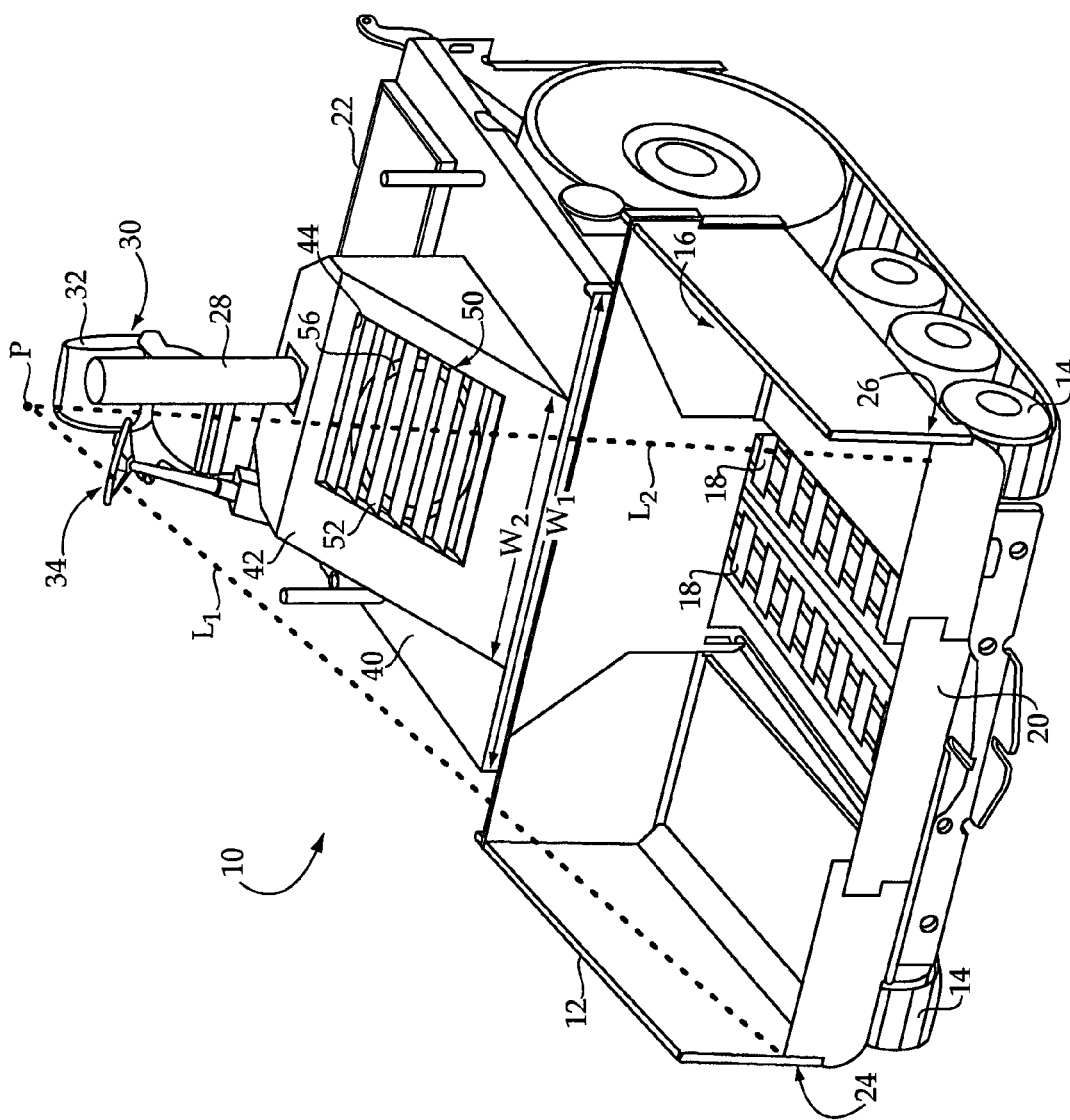
FIG. 1 is a diagrammatic view of a machine according to one embodiment.

Referring to FIG. 1, there is shown a machine 10 according to one embodiment of the present disclosure. Machine 10 is shown as a paving machine of the type commonly used in asphalt paving, having a body 12 which includes a front end 20, a back end 22, a deck 40 mounted on body 12 and a hopper 16 for storing paving material positioned between deck 40 and front end 20, and having conveyors 18 positioned therein for conveying paving material in a conventional manner. In the illustrated embodiment, machine 10 includes ground engaging propulsion elements 14 such as tracks, and at least one open-air operator station 30 positioned on deck 40. While one application of the present disclosure is in the context of a paving machine, other embodiments are contemplated. For example, machine 10 might be any of a variety of machines having open-air operator stations, such as certain agricultural machines, material handling machines, various types of construction and mining machines, etc. Machine 10 may further include a cooling system 50 configured to draw cooling air through body 12 via a cooling air flow path and eject cooling air in a forward direction away from operator station 30, for reasons which will be apparent from the following description.

In one embodiment, body 12 may further include a cooling system housing 42 which extends vertically upward from deck 40, having a height H. Cooling system housing 42 may further have a width $W_2$ which is less than about two thirds of a width $W_1$ of deck 40, and in some embodiments may be about one-half of width $W_1$. In certain embodiments, height H will be less than width $W_2$. A fan 56, which may be a variable speed hydraulically powered axial fan, may be positioned at least partially within housing 42 and is configured to draw cooling air for machine 10 through body 12, as further described herein. In other embodiments, a tangential fan, an electrically powered fan, etc., might be used. At least one airflow directing structure 52 may extend across an outlet 44 in housing 42 and may be configured to direct cooling air ejected from housing 42 in a forward direction, i.e. toward front end 20, away from operator station 34. In one embodiment, the at least one airflow directing structure 52 may include a plurality of louvers 52 which extend across outlet 44.

Operator station 30 may include an operator seat 32 and a set of operator controls 34. In one embodiment, dual operator stations may be provided, one corresponding to each side of machine 10. In other embodiments, a movable operator station might be used, or a single, non-moving conventional open-air operator station, depending upon jurisdictional requirements. A line of sight is available to an operator seated at operator station 30. In one embodiment, the operator line of sight will be unobstructed by cooling system housing 42 from a point P, at a predetermined height vertically above seat 32, extending to a front right corner 24 of body 12, as well as from point P to a front left corner 26 of body 12. Lines $L_1$ and $L_2$ shown in FIG. 1 illustrate the unobstructed line of sight and may be understood to define a conical portion of a field of view originating at point P which is not obstructed by housing 42. An exhaust stack 28 may extend vertically upward from housing 42, and may by coupled with a portion of an exhaust system such as a muffler, aftertreatment element, etc. which is positioned within housing 42 and thus not visible in FIG. 1.

Figure 2:
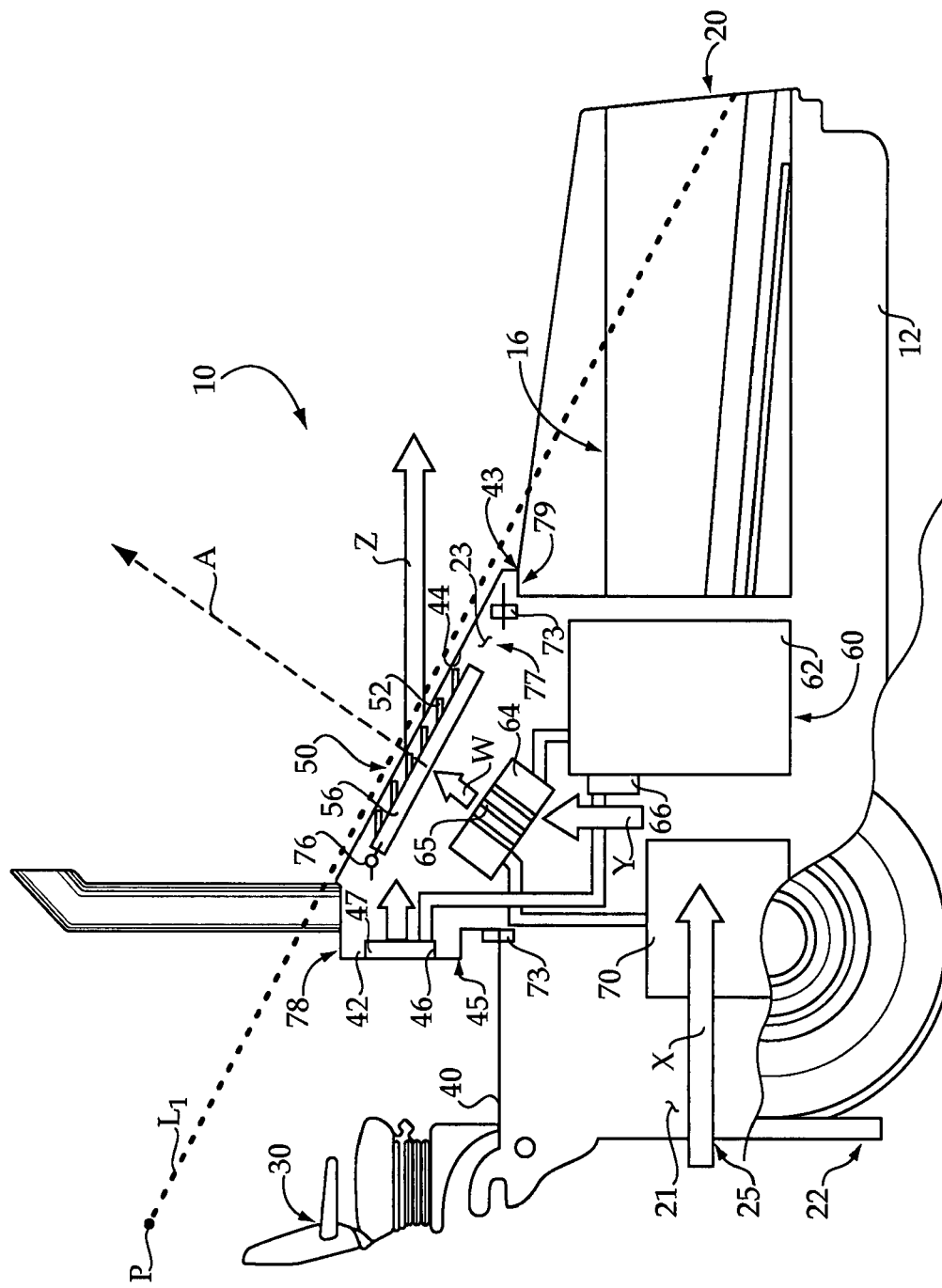
FIG. 2 is a side diagrammatic view of a machine according to one embodiment.

Referring also to FIG. 2, there is shown a side diagrammatic view of machine 10, partially in cut-away. Machine 10 may include an engine system 60 which is positioned within an engine compartment 21 in body 12. Engine compartment 21 may be vertically below deck 40 and, hence, vertically below operator station 30 and housing 42. In one embodiment, engine system 60 may include an engine 62, a radiator 64 and a turbocharger 66, as well as other components not shown. A hydrostatic drive 70 may also be positioned within engine compartment 21 and coupled with ground engaging elements 14, or other subsystems of machine 10.

One or more cooling air inlets 25 may permit ambient air to be drawn into engine compartment 21, from back end 22 but additionally or alternatively from lateral sides of machine 10. In one embodiment, cooling system 50 may be configured via fan 56 to draw cooling air in a flow path through body 12, the flow path including an intake segment X whereby cooling air enters and flows through engine compartment 21, for example in a generally horizontal direction. The flow path may further include a second segment Y whereby cooling air travels from engine compartment 21 via an inlet 77 to a second compartment 23 within cooling system housing 42, for example generally in a vertically upward direction. The flow path may further include a terminal segment Z whereby cooling air exits housing 42 in a forward direction toward front end 20 and away from operator station 30. In one embodiment, terminal segment Z may be generally horizontal, but could have a vertical component, either downward or upward, in other embodiments. A salient feature of terminal segment Z is that hot air is ejected away from operator station 30, and not out of sides of machine 10. It will be noted from FIG. 2 that fan 56 is positioned adjacent outlet 44 and ejects cooling air from housing 42 in cooperation with louvers 52 to terminal segment Z. Fan 56 may also be mounted on hinges 76 to enable it to be swung upwardly for ease of accessing components in engine compartment 21.

In one embodiment, terminal segment Z may define a line segment originating at outlet 44 and having a direction which is generally horizontal and vertically above hopper 16. Ejecting air in the manner described via segment Z can inhibit traveling of fumes from paving material stored in hopper 16 towards operator station 30. FIG. 2 further illustrates a side profile for housing 42 sloping downwardly toward front end 20. In one embodiment, an axis of rotation A of fan 56 may be oriented perpendicular the sloping profile of housing 42, which allows housing 42 to be made relatively low and out of the way with respect to the operator field of view, as described herein. Louvers 52 may in turn be oriented at an angle, greater than zero, with respect to axis A to enable directing of airflow to terminal segment Z. As mentioned above, engine system 60 may also include a turbocharger 66. An air-to-air aftercooler 47 may be coupled with turbocharger 66 and extends across an inlet 46 to cooling system housing 42. Providing aftercooler 47 with an inlet 46 separate from inlet 77 allows ambient cooling air for aftercooler 47 to be supplied directly rather than after passing through engine compartment 21. Cooling requirements for a turbocharger aftercooler can in some instances drive the fan speed requirements. By providing aftercooler 47 with a separate inlet, fan speed may be somewhat lower than would otherwise be required. In one embodiment, airflow passages of the heat exchangers associates with engine system 60, namely, radiator 64, aftercooler 47 and an oil cooler 68 shown in FIG. 3, may include airflow passages which are oriented parallel axis A of fan 56. In FIG. 2, radiator 64 is shown having a plurality of airflow passages 65 which are oriented parallel axis A to facilitate airflow therethrough.

Certain of the components of cooling system 50 may be mounted as a subassembly to deck 40 in some embodiments. To this end, housing 42 may be coupled with deck 40 via mounting elements 73 configured to locate housing 42 at a position forward of operator station 30 and rearward of hopper 16. In one embodiment, a first set of mounting elements 73, for example fasteners in a predetermined pattern, may be located adjacent a front end of housing 42, whereas a second set of fasteners 73, also potentially in a predetermined pattern could be located adjacent a back end 45 of housing 42. Deck 40 might be configured complementarily to receive fasteners 73 for mounting housing 42 with fan 56, and potentially other components, positioned therein, on deck 40 in a desired location and orientation. The present disclosure is not limited in this regard, however, and in other embodiments housing 42 might be irreversibly coupled to or integral with deck 40. In either instance, the present disclosure contemplates a retrofit system wherein cooling system 50 is coupled with an existing paving machine to provide improved performance, comfort, etc. over state of the art systems.

Figure 3:
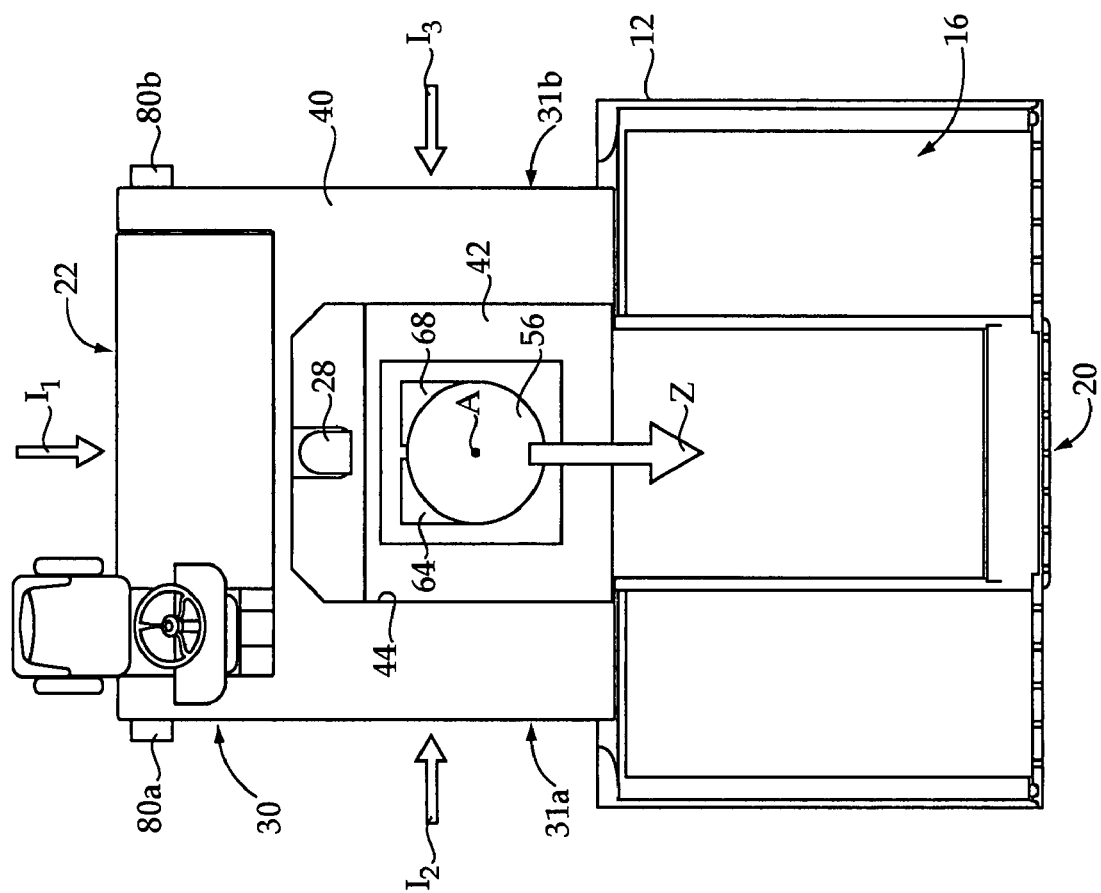
FIG. 3 is a diagrammatic top view of a machine according to one embodiment.

Turning now to FIG. 3, there is shown a top diagrammatic view of machine 10. As alluded to above, ambient air may be drawn into body 12 at any number of locations, and in any of several flow directions. In one embodiment, ambient air may be drawn in from lateral sides 31a and 31b of machine 10 and from back end 22, via flow paths $I_2$, $I_3$ and $I_1$, respectively. Multiple inlets as shown provide the advantage of relatively lower flow rates per unit area, associated with relatively lesser amounts of debris being drawn into body 12. Terminal segment Z is also shown in FIG. 3 extending forwardly from outlet 44 of housing 42. Also shown in FIG. 3 are radiator 64 and oil cooler 68, positioned in a side-by-side arrangement within housing 42 and behind/underneath fan 56. In other embodiments, radiator 64 and oil cooler 68 might be positioned in series, however, the side-by-side arrangement is believed to optimize cooling efficacy in at least some embodiments.

INDUSTRIAL APPLICABILITY

Referring to the drawings generally, during a typical paving operation, machine 10 will advance forward via actuation of ground engaging elements 14. A screed (not shown) will typically be coupled with machine 10 at back end 22, and will generate a paving material mat in a conventional manner. Operation of engine system 60, hydrostatic drive 70 and other components positioned within engine compartment 21 or elsewhere on machine 10 will tend to generate heat. Cooling system 50 may be used to dissipate the heat by drawing cooling air through body 12 and ejecting the cooling air after exchanging heat with internal components of machine 10, via the flow path described herein.

Most paving machines operate with a crew of workers, including an operator at operator station 30 as well as screed operators or other technicians who may also ride on machine 10. It is common for members of the crew to at least periodically work or ride alongside machine 10, operating the screed, monitoring progress, verifying travel path or mat characteristics, removing debris, etc. In certain earlier designs, cooling air was drawn into an engine compartment of the paving machine, passed generally in a straight line through the machine and then exhausted out the side of the machine opposite to that which it entered. While passing through the machine, the cooling air would exchange heat with internal engine and hydraulic components, radiators, etc., positioned therein, increasing a temperature of the cooling air. The present disclosure avoids any problems or discomfort associated with working alongside a paving machine that is ejecting hot cooling air by directing the cooling air forwardly rather than to the sides. Operator comfort can also be enhanced over conventional machines. A related issue common in paving machines relates to the effects of exhausting hot air toward sensors positioned alongside the machine. FIG. 4 illustrates first and second sensors 80a and 80b, which may be sonic sensors, positioned on sides 31a and 31b, respectively, of machine 10. A grade/slope sensor (not shown) may also be positioned on body 12 in the same general area as sensors 80a and 80b. It will be readily apparent that exhausting cooling air via a flow path having a terminal segment similar to that of terminal segment Z substantially reduces the likelihood of hot air affecting sensor operation as compared with earlier designs which exhausted hot air near and/or toward sensors mounted on sides of a paving machine.

Another issue with certain earlier machine designs relates to fumes from paving material stored in the hopper traveling back toward an operator station, or accumulating in hopper 16. To enhance visibility, it is conventional for paving machines to have an open-air operator station such that obstructions to the operator's field of view are limited. A downside to this approach is that fumes can relatively easily drift back toward the operator. The present cooling system design also addresses issues of operator comfort in that the forward flow of exhausted cooling air can blow fumes away from operator station 30 and clear them from hopper 16.

The present description is for illustrative purposes only and should not be construed to narrow the breadth of the present disclosure in any way. Thus, those skilled in the art will appreciate that various modifications might be made to the presently disclosed embodiments without departing from the full and fair scope of the present disclosure. For example, while the present disclosure illustrates fan 56 oriented such that cooling air is redirected via louvers 52, in other embodiments fan 56 might be oriented such that its axis A is relatively more horizontal and cooling air is ejected forwardly within the need to be redirected via louvers, etc. Other aspect, features and advantages will be apparent from an examination of the attached drawings and appended claims.

What is claimed is:

1. A machine comprising:
 a body having a front end, a back end and at least one cooling air inlet, said body further including an engine compartment and a second compartment positioned vertically above and fluidly connected with said engine compartment, said second compartment defining a cooling air outlet from said body which is vertically above said at least one cooling air inlet;
 at least one open-air operator station mounted on said body and being positioned vertically above said engine compartment and rearward of said second compartment; and
 a cooling system having a fan configured to draw cooling air in a flow path through said body, said flow path including an intake segment whereby cooling air enters said engine compartment via said at least one cooling air inlet, a second segment whereby cooling air travels from said engine compartment to said second compartment and a terminal segment whereby cooling air exits said body via said cooling air outlet in a forward direction away from said at least one operator station.

2. The machine of claim 1 wherein said body comprises a deck having said at least one operator station positioned thereon and a cooling system housing also positioned on said deck and defining said second compartment, wherein said fan is positioned at least partially within said cooling system housing and configured to eject cooling air through said outlet in cooperation with at least one airflow directing structure of said cooling system.

3. The machine of claim 2 wherein said housing includes a side profile sloping downwardly toward the front end of said body, and wherein said fan comprises an axial fan having an axis of rotation oriented perpendicular to said side profile.

4. The machine of claim 2 comprising a paving machine having a hopper for storing paving material positioned between said deck and said front end.

5. The machine of claim 4 wherein the terminal segment of said flow path defines a line segment originating at said outlet and extending in a direction which is vertically above said hopper.

6. The machine of claim 4 wherein said hopper includes a first front corner and a second front corner and said machine has a line of sight from said at least one operator station to each of said front corners which is not obstructed by said cooling system housing.

7. The machine of claim 4 wherein said fan comprises an axial fan having an axis of rotation, and wherein said at least one airflow directing structure comprises a plurality of louvers extending across said inlet and being oriented at an angle, greater than zero, relative to said axis of rotation.

8. The machine of claim 7 further comprising an engine system positioned within said engine compartment and including at least one heat exchanger, wherein said at least one heat exchanger includes a plurality of airflow passages which are oriented parallel to said axis of rotation.

9. The machine of claim 7 wherein said at least one heat exchanger includes a hydraulic oil cooler and an engine radiator positioned side by side with respect to said flow path.

10. The machine of claim 2 further comprising an ambient air inlet positioned in said cooling system housing and an air-to-air aftercooler extending across said ambient air inlet.

11. A method of cooling a machine system comprising the steps of:
- drawing cooling air for the machine system into an engine compartment of a machine body via an intake segment of a cooling air flow path;
- drawing the cooling air from the engine compartment into a second compartment positioned vertically above the engine compartment via a second segment of the cooling air flow path; and
- ejecting the cooling air from the machine body in a forward direction away from an open-air operator station positioned vertically above the engine compartment and rearward of the second compartment via a terminal segment of the cooling air flow path.

12. The method of claim 11 further comprising a step of exchanging heat with at least one heat exchanger of the machine system via at least one of the drawing steps, wherein the step of ejecting the cooling air includes ejecting the cooling air from an outlet of a cooling system housing wherein the second compartment is disposed, subsequent to the step of exchanging heat.

13. The method of claim 12 wherein each of the drawing steps includes drawing cooling air via an axial fan positioned adjacent the outlet, and wherein the ejecting step includes a step of redirecting cooling air from the axial fan to the terminal segment of the flow path via a plurality of louvers extending across the outlet.

14. The method of claim 12 wherein the machine system comprises an engine system of a paving machine having a deck whereupon the operator station is disposed, and a paving material hopper positioned forwardly of the deck, the method further comprising a step of:
- inhibiting flow of gases in a direction from the hopper towards the operator station at least in part via the step of ejecting the cooling air.

15. A cooling system subassembly for a machine comprising:
- a housing having a front end and a back end, an upper side and a lower side, and mounting elements having a configuration adapted to position said housing on a machine body at a location forward of an open-air operator station on the machine body and vertically above an engine compartment within the machine body;
- said housing further including a cooling air inlet disposed in said lower side and a cooling air outlet; and
- a fan disposed at least partially within said housing and adapted to draw cooling air from the engine compartment into said housing via a segment of a cooling air flow path and eject cooling air from said outlet via a terminal segment of said flow path in a forward direction away from the open-air operator station.

16. The cooling system subassembly of claim 15 wherein said housing is adapted to mount via said mounting elements to a deck of a paving machine between an open-air operating station of the paving machine and a paving material hopper of the paving machine, said housing further including at least one airflow directing structure positioned adjacent said outlet which is configured to direct cooling air from said fan to said terminal segment in a forward direction away from the open-air operator station and toward the paving material hopper of the paving machine.

17. The cooling system subassembly of claim 16 wherein said fan comprises an axial fan having an axis of rotation, and wherein said at least one airflow directing structure comprises a plurality of louvers extending across said outlet and being disposed at an angle, greater than zero, relative to the axis of rotation of said fan.

18. The cooling system subassembly of claim 17 comprising hinges mounting said fan within said housing.

19. The cooling system subassembly of claim 17 wherein said housing has a width and a height less than its width and includes a downwardly sloping profile toward said front end, and wherein the axis of rotation of said fan is oriented perpendicular said profile.

20. The cooling system subassembly of claim 15 wherein said housing includes a second inlet for ambient cooling air positioned at said back end.

* * * * *